United States Patent [19]

Ebiike et al.

[11] Patent Number: 5,720,779
[45] Date of Patent: Feb. 24, 1998

[54] ANTHRAQUINONE REACTIVE DYE COMPOSITIONS AND METHODS FOR DYEING OR PRINTING USING THE SAME

[75] Inventors: Yoshimi Ebiike, Isumi; Takeshi Washimi, Toyonaka; Yasuyoshi Ueda, Hirakata; Takashi Omura, Kobi, all of Japan

[73] Assignee: Sumitomo Chemical Company, Limited, Osaka, Japan

[21] Appl. No.: 591,267

[22] Filed: Jan. 22, 1996

[30] Foreign Application Priority Data

Jan. 24, 1995 [JP] Japan ................................ 7-009040

[51] Int. Cl.$^6$ .................... C09B 67/22; C09B 62/505; D06P 1/384
[52] U.S. Cl. .................... 8/549; 8/643; 8/675; 8/676; 8/677
[58] Field of Search ................ 8/549, 643, 675, 8/676, 677

[56] References Cited

U.S. PATENT DOCUMENTS 5,536,277  7/1996  Shimode et al. ................ 8/549

FOREIGN PATENT DOCUMENTS

| 1411257 | 12/1965 | France . |
| 60-181375 | 9/1985 | Japan . |
| 02005780 | 1/1990 | Japan . |
| 958899B | 5/1964 | United Kingdom . |

OTHER PUBLICATIONS

Chemical Abstracts vol. 104, No. 16, Apr. 1986 #131405z. Omura et al., & JP-A-60–181375, Sep. 1985.
Chemical Abstracts vol. 105, No. 2, Jul. 1986, #8027w.
Ikeo et al. & JP-A-60 226575, Nov. 1985.
Chemical Abstracts vol. 104, No. 10, Mar. 1986, #70249c. Kasei Hoechst Co., Ltd. & Jp-A-60 108472, Jun. 1985.

*Primary Examiner*—Margaret Einsmann
*Attorney, Agent, or Firm*—Watson Cole Stevens Davis, P.L.L.C.

[57] ABSTRACT

A reactive dye composition comprising an anthraquinone compound(I) of the following formula:

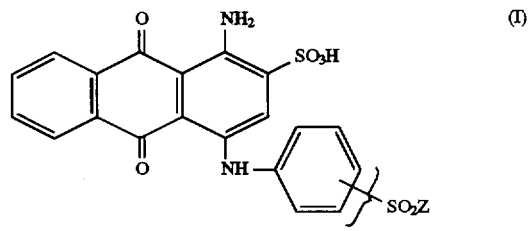

wherein Z represents —CH=CH2 or —CH2CH2Z$^1$ in which Z$^1$ represents a group splitable by the action of an alkali other than a carboxypyridinio group and an anthraquinone compound(II) of the following formula:

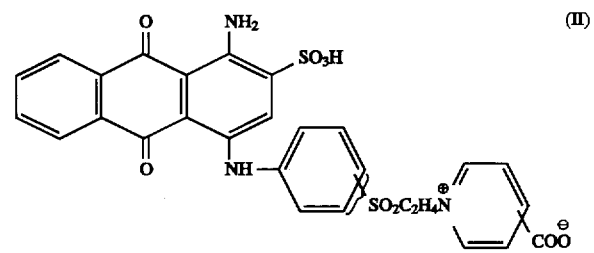

and a method for dyeing or printing cellulose-containing fiber materials using the same.

4 Claims, No Drawings

ANTHRAQUINONE REACTIVE DYE COMPOSITIONS AND METHODS FOR DYEING OR PRINTING USING THE SAME

The present invention relates to anthraquinone-type reactive dye compositions capable of dyeing or printing cellulose fibers or cellulose-containing fiber materials, such as cellulose-containing mixed yarns, in blue color or usable as a blue component when dyeing or printing the materials together with another dye, and capable of dyeing or printing the cellulose fibers or cellulose-containing fiber materials (hereinafter in this specification, "cellulose-containing fiber material" includes "cellulose fiber" itself.) with good levelness and reproducibility and of giving dyed products having high brightness and good fastness.

Hitherto, water soluble reactive dyes for dyeing or printing cellulose-containing fiber materials have been required to have various good dye characteristics such as levelling property, reproducibility of dyeing and printing, solubility and fastness. Among the reactive dyes, anthraquinone-type reactive dyes have been widely used for dyeing or printing fiber materials in blue color, and they have been particularly required to have good dye characteristics such as levelling property, reproducibility of dyeing and printing and solubility.

However, conventional anthraquinone-type reactive dyes still have problems such that it is difficult to obtain evenly dyed or printed materials with good reproducibility by using the reactive dyes, and that solubility of the reactive dyes is insufficient.

An object of the present invention is to provide anthraquinone type blue reactive dyes capable of giving dyed or printed products with good levelness and reproducibility in various kinds of dyeing and printing method, and having sufficient solubility.

Inventors of the present invention have found that a combination of dyes having specific structures gives an industrially advantageous, anthraquinone-type blue reactive dye superior in dye characteristics such as reproducibility, levelling property and solubility in various kinds of dyeing and printing methods. Thus, the present invention has been accomplished.

The present invention provides a reactive dye composition comprising
1 part by weight of an anthraquinone compound(I) which is a compound represented by the following formula:

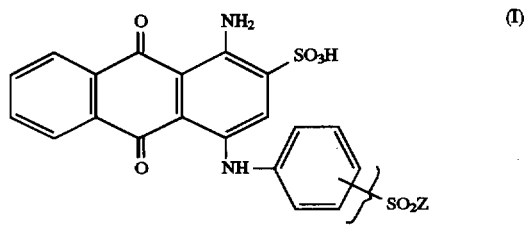

wherein Z represents —CH=CH$_2$ or —CH$_2$CH$_2$Z$^1$ in which Z$^1$ represents a group splitable by the action of an alkali other than a carboxypyridinio group and/or a salt thereof, and 0.01–1000 parts by weight of an anthraquinone compound(II) which is a compound represented by the following formula:

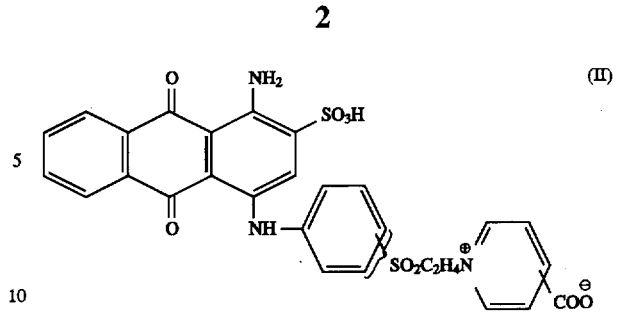

and/or a salt thereof.

The present invention also provides a method for dyeing or printing cellulose containing fiber materials by using the reactive dye composition.

The group, denoted by Z$^1$ in formula(I), splitable by the action of an alkali, does not include a carboxypyridinio group. Examples of the group denoted by Z$^1$ include a sulfate group, a thiosulfate group, a phosphate group, an acetate group and a halogen atom.

The anthraquinone compounds(I), which include C. I. Reactive Blue 19, are known compounds disclosed in, for example, JP-A-60-108472. The anthraquinone compounds (I) can be produced according to a known method. For example, the anthraquinone compounds(I) can be produced by allowing 1-amino-4-bromo anthraquinone-2-sulfonic acid or a salt thereof to react with an aniline the benzene ring of which is substituted by a group -SO$_2$Z in which Z has the same meaning as defined above, or by allowing 1-amino-4-bromo anthraquinone-2-sulfonic acid or a salt thereof to react with 3- or 4-(β-hydroxyethyl sulfonyl) aniline, followed by esterification of the-hydroxyl group.

The anthraquinone compounds(II) can be produced by subjecting anthraquinone compounds(I) to a condensation reaction with a carboxy pyridine represented by the following formula:

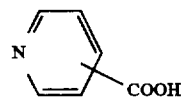

and/or a salt thereof in an aqueous solvent at a temperature of 0°–100° C. and at a pH adjusting to lie in the range from 1 to 10, preferably at 10°–100° C. and at a pH adjusting to lie in the range from 2 to 9. According to the method above, if proper reaction conditions are adopted, a mixture of an anthraquinone compound(I) and an anthraquinone compound(II) having a compounding ratio within the range of the present invention can be obtained as the reaction product. Hence, the method is preferable for producing the reactive dye composition of the present invention.

Each of the anthraquinone compound(I) and the anthraquinone compound(II) may be either one kind of compound represented by the formula(I) or (II) respectively and/or a salt thereof or a mixture of two or more kinds of compounds represented by the formula(I) or (II) respectively and/or a salt thereof.

The compounding ratio of the total weight of anthraquinone compounds(I) to the total weight of anthraquinone compounds(II) is in the range of(I):(II)= 1:0.01–1000, preferably in the range of (I):(II)=1:0.1–100, more preferably in the range of (I): (II)=1:0.2–20.

Each of the anthraquinone compounds(I) or (II) may be in the form of a free acid or a salt thereof. Preferably they are in the form of alkali metal salt or alkaline earth metal salt. and particularly preferably in the form of sodium salt, potassium salt or lithium salt. They may also form addition salts with organic or inorganic acids.

The compounds of formula (II) may exist in other zwitterionic forms corresponding to the transfer of hydrogen cations, for example:

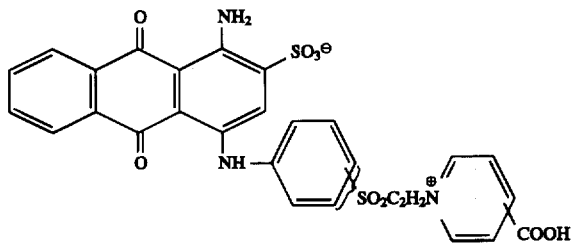

It is to be understood that all such zwitterionic forms are included within the definition of formula (II).

Among anthraquinone compounds(I), a compound represented by the following formula(III):

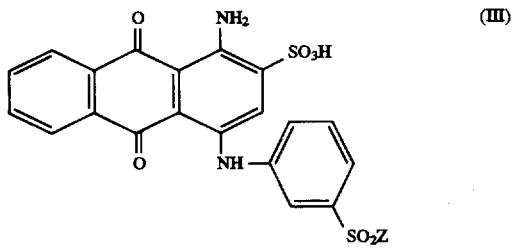

wherein Z has the same meaning as defined above or a salt thereof is preferable. Particularly, a compound of formula (III) wherein Z is —$CH_2CH_2Z^1$ in which $Z^1$ is as defined above or a salt thereof is preferable.

Among anthraquinone compounds(II), a compound represented by the following formula(IV):

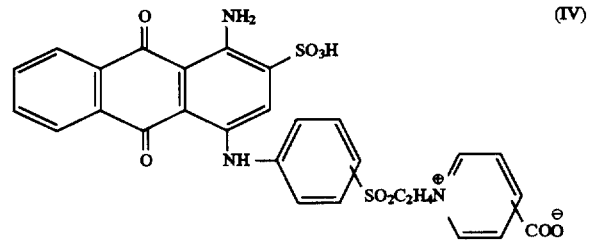

or a salt thereof is preferable.

A method for blending anthraquinone compounds(I) and anthraquinone, compounds(II) is not particularly limited. The blending may be carried out either prior to dyeing or printing or at the stage of preparing a dye bath or a printing paste in the course of dyeing or printing the fiber materials. As mentioned above, composition of the present invention can also be obtained as a reaction product of a reaction for preparing an anthraquinone compound(II) from anthraquinone compound(I).

In order to obtain a desired color, the reactive dye composition of the present invention can be used in combination with other dye. The dyes to be mixed with the reactive dye composition of the present invention is not particularly limited. Any known reactive dye may be used for this purpose. Preferable examples as the reactive dyes to be mixed with the reactive dye composition of the present invention include those having one or more reactive groups at least one of which is selected from sulfatoethylsulfonyl group, vinylsulfonyl group. monochlorotriazinyl group, dichlorotriazinyl group, monofluorotriazinyl group, monopyridinio triazinyl group, difluoro monochloro pyrimidinyl group and trichloropyrimidinyl group; those on the market with the commercial name of Sumifix, Sumifix Supra, Remazol, Levafix, Procion, Cibacron, Basilen, Drimarene, Kayacion and Kayacelon React.; and those disclosed in, for example, JP-A-50-178, EP-A-22265 (JP-A-56-9483), EP-A-21105 (JP-A-56-15481), EP-A-35171 (JP-A-56-118976), JP-A-56-128380, EP-A-42108(JP-A-57-2365), EP-A-52985(JP-A-57-89679), EP-A-56975(JP-A-57-143360), JP-A-58-191755, EP-A-99721(JP-A-59-15451), JP-A-59-96174, JP-A-59-161463, JP-A-60-6754, JP-A-60-123559, GB-A-2160883(JP-A-60-229957), JP-A-60- 260654, E,P-A-184071(JP-A- 61-155469), EP-A-239847(JP-A-63-77974), EP-A-264878(JP-A-63-225665), EP-A-325246(JP-A-1-185370) or EP-A-385120(JP-A-3-770).

Particularly, dyes having at least one reactive dye selected from sulfatoethylsulfonyl group, vinylsulfonyl group. monochlorotriazinyl group and monofluorotriazinyl group; and dyes on the market with the commercial name of Sum/fix, Sum/fix Supra, Remazol, Levafix and Procion are preferable.

The reactive dye composition of the present invention may contain an inorganic salt such as anhydrous sodium sulfate and sodium chloride, a dispersant, a non-dusting agent, a pH stabilizer, a water softening agent such as polyphosphate, and other known auxiliaries.

The reactive dye composition of the present invention is not particularly limited in its form and may have a known form such as powder. granule and liquid.

The cellulose containing fiber materials to which the reactive dye composition of the present invention is applied are not particularly limited. They include natural and regenerated cellulose fibers such as cotton, linen, flax, jute, ramie fiber, viscose rayon and bemberg fiber. The cellulose containing fiber materials also include, for example, cotton/polyester blend, cotton/nylon blend, cotton/wool blend and cotton/silk blend.

In the present invention, the dyeing and printing can be carried out by known methods, for example, exhaustion dyeing, continuous dyeing, cold-pad-batch dyeing and printing methods.

As an example of the exhaustion dyeing, a method which comprises, together with dyes, using a known inorganic neutral salt such as anhydrous sodium sulfate or sodium chloride, and/or a known acid binding agent such as sodium hydroxide, sodium bicarbonate, sodium carbonate and sodium tertiary phosphates can be mentioned.

There is no limitation on the amounts of the inorganic neutral salt and acid binding agent. Usually, amount of the inorganic neutral salt or acid binding agent, or total amount of the inorganic neutral salt and acid binding agent when both are used, is 1 g/liter or more. Although they may be used in an amount of 100 g/liter or more a small amount of 40 g/liter or less in total of both may be enough to carry out the dyeing in the present invention. The inorganic neutral salt and acid binding agent may be added into the dyeing bath either in one portion or in portions in the conventional manner. Known dyeing auxiliaries such as levelling agents, retarding agents and dye bath lubricants may be used according to known methods. The dyeing temperature is usually 30°–95° C.

Padding on cellulose fiber materials can be carried Out by a one phase padding manner or a two phase padding manner. The one-phase printing may be conducted by printing the fiber-materials with a printing paste containing an acid-binding agent such as sodium bicarbonate and the like, followed by steaming at a temperature of up to 160° C. The two-phase printing may be conducted by printing the fiber materials with a neutral or weakly acidic printing paste. and passing the materials through a hot alkaline bath containing an electrolyte or over-padding the materials with an alkaline padding liquor containing an electrolyte followed by a steaming or dry-heating treatment. For the preparation of the printing paste, a paste or emulsifier such as sodium alginate or starch ether is used optionally together with a conventional printing auxiliary such as urea and/or a dispersant.

As an example of the cold-pad-batch dyeing, a method which comprises padding a fiber material using a known inorganic neutral salt such as anhydrous sodium sulfate or sodium chloride and/or a known acid binding agent such as sodium hydroxide and sodium silicate together with dyes, followed by leaving the fiber material in a sealed pack at a specific temperature can be mentioned.

As an example of the continuous dyeing, a one-phase padding manner which comprises padding a fiber material with a padding liquor containing an acid binding agent such as sodium carbonate or sodium bicarbonate as well as dye according to a known manner, followed by dry-heating or steaming; or a two-phase padding manner which comprises padding a fiber material with a padding liquor containing dye, and padding the fiber material with inorganic neutral salt such as anhydrous sodium sulfate or sodium chloride and an acid binding agent such as sodium carbonate or sodium bicarbonate, followed by dry-heating or steaming can be mentioned.

As an example of the printing method, the one-phase printing method which comprises printing the fiber materials with a printing paste containing dye and an acid-binding agent such as sodium bicarbonate, followed by dry-heating or steaming, and two-phase printing method which comprises printing the fiber materials with a printing paste containing dye, followed by passing the materials through a hot bath at a temperature of 80° C. or more containing inorganic neutral salt such as sodium chloride and a known acid binding agent such .as sodium hydroxide or sodium silicate can be mentioned.

As long as capable of coloring cellulose containing fiber materials, any dyeing and printing method using the reactive dye composition of the-present invention other than the methods mentioned above can be employed.

The present invention will be explained in more detail by referring to the following examples. which are only illustrative and should not be considered to limit this invention, i.e. method for blending and compounding ratio, form of the reactive dye composition, etc. are never limited by the examples. In the examples. "part" and "%" are by weight.

EXAMPLE 1

117 parts of anthraquinone compound the free acid form of which is represented by the following formula (a):

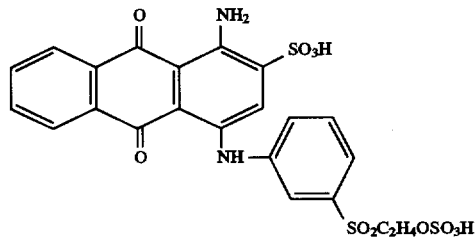

were dissolved in 590 parts of water, and then, 74 parts of nicotinic acid was added thereto. While keeping the pH at 5–6 with dropwise adding aqueous sodium carbonate solution and maintaining the temperature at 70°–80° C., the reaction mixture was stirred for 6 hours. Thereafter, the reaction mixture was spray dried to obtain a reactive dye composition which contains 23 parts of compound of formula(a) and 97 parts of compound the free acid form of which is represented by the following formula (b):

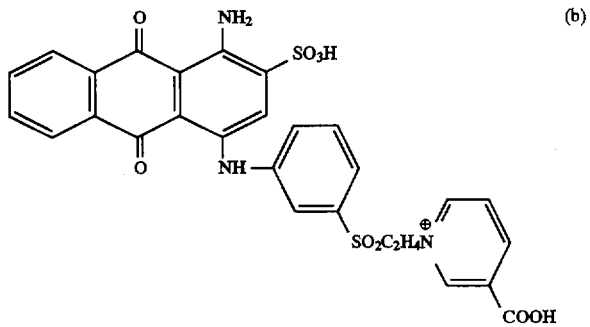

The reactive dye composition thus obtained has good solubility.

In a wince dyeing machine, was set 100 parts of a knit cotton fabric. The liquor ratio and water temperature were adjusted to 1:15 and 50° C., respectively. Then, 3 parts of the reactive dye composition obtained above was dissolved in water, the resulting solution was added to dye-bath in the dyeing machine and the bath temperature, was kept at 50° C. for a while. 150 parts of anhydrous sodium sulfate was added into the bath and, then, at this temperature, the knit fabric was treated for 20 minutes. Thereafter, 30 parts of sodium carbonate was added to the bath, and, then, the knit fabric was treated at this temperature for 60 minutes to complete the dyeing and was washed according to a conventional manner. A dyed product dyed in Bright blue color with excellent levelness was obtained.

Comparative Example 1

Dyeing treatment in Example 1 was repeated except that the reactive dye composition containing compound of formula (a) and compound of formula (b) was replaced by the compound of formula (a) alone to obtain a dyed product. Unevenness was observed on various parts of the dyed product.

EXAMPLE 2

120 parts of anthraquinone compound of the formula(a) were dissolved in 230 parts of water, and then, 27 parts of nicotinic acid was added thereto. While keeping the pH at 4.5–5.5 with dropwise adding aqueous sodium carbonate solution and maintaining the temperature at 80°–90° C., the reaction mixture was stirred for 6 hours. While dropwise adding aqueous soda ash solution and keeping pH and solution temperature at 4.5–5.5 and 80°–90° C., respectively, the resulting mass was agitated for 3 hours. Thereafter, the reaction mass was spray dried to obtain a reactive dye composition which contains 57 parts of compound of formula(a) and 61 parts of compounds of formula (b). The reactive dye composition thus obtained has good solubility.

Dyeing was conducted according to the same manner as in Example 1 to obtain a dyed product dyed in bright blue color with excellent levelness.

EXAMPLE 3

Reaction for preparing the reactive dye composition in Example 1 was repeated except that the anthraquinone compound of formula (a) was replaced by the compound the free acid form of which is represented by the following formula (c):

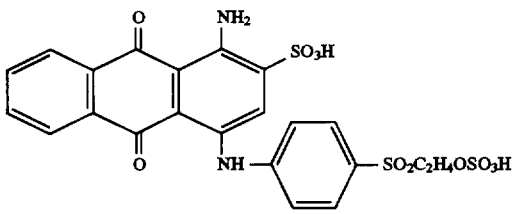

to obtain a reactive dye composition which contains 23 parts of compound of formula(c) and 97 parts of compound the free acid form of which is represented by the following formula (d):

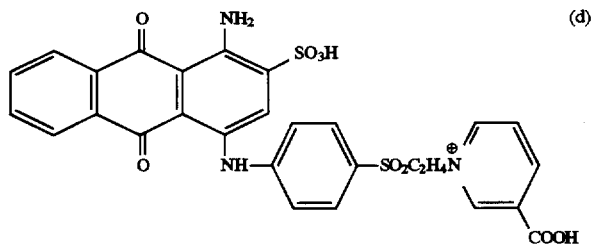

The reactive dye composition thus obtained has good solubility.

Dyeing procedure in Example 1 was repeated except that the reactive dye composition containing compound of formula (a) and compound of formula (b) was replaced by the reactive dye composition obtained above containing compound of formula (c) and compound of formula (d) to Obtain a dyed product dyed in bright blue color with excellent levelness.

Comparative Example 2

Dyeing procedure in Example 1 was repeated except that the reactive dye composition containing compound of formula (a) and compound of formula (b) was replaced by the compound of formula (c) alone to obtain a dyed product which was inferior in levelness.

EXAMPLE 4

Reaction for preparing the reactive dye composition in Example 2 was repeated except that the anthraquinone compound of formula (a) was replaced by the compound of formula (c) to obtain a reactive dye composition which contains 57 parts of compound of formula(c) and 61 parts of compound of formula (d). The reactive dye composition thus obtained has good solubility.

Dyeing procedure in Example 1 was repeated except that the reactive dye composition containing compound of formula (a) and compound of formula (b) was replaced by the reactive dye composition obtained above (in this example) to obtain a dyed product dyed in bright blue color with excellent levelness.

EXAMPLE 5

117 parts of anthraquinone compound of the formula(a) were dissolved in 350 parts of water, and then, 25 parts of nicotinic acid was added thereto. While keeping the pH at 5-6 with dropwise adding aqueous sodium carbonate solution and maintaining the temperature at 70°-80° C., the reaction mixture was stirred for 20 hours. Thereafter, the reaction mass was spray dried to obtain 96 parts of an anthraquinone compound of formula(b). To the anthraquinone compound thus obtained, 39 parts of anthraquinone compound of the formula(a) was added and mixed. The a reactive dye composition thus obtained has good solubility.

Dyeing was conducted according to the same manner as in Example 1 to obtain a dyed product dyed in bright blue color with excellent levelness.

EXAMPLE 6

117 parts of anthraquinone compound of the formula(a) were dissolved in 350 parts of water, and then, 25 parts of nicotinic acid was added thereto. While keeping the PH at 5-6 with dropwise adding aqueous sodium carbonate solution and maintaining the temperature at 70°-80° C., the resulting reaction mixture was stirred for 20 hours to obtain a reaction mass containing 96 parts of an anthraquinone compound of formula(b). To the anthraquinone compound thus obtained, an aqueous solution prepared by dissolving 39 parts of anthraquinone compound of the formula(a) in 100 parts of water was added and they were mixed thoroughly and spray dried. The reactive dye composition thus obtained has good solubility.

Dyeing was conducted according to the same manner as in Example 1 to obtain a dyed product dyed in bright blue color with excellent levelness.

EXAMPLE 7

Reaction for preparing the reactive dye composition in Example 5 was repeated except that the anthraquinone compound of formula (a) was replaced by the compound of formula (c) to obtain 96 parts of compound of formula(d). To the resulting compound, 39 parts of the compound of formula(c) was added and they were mixed thoroughly. The reactive dye composition thus obtained has good solubility.

Dyeing procedure in Example 1 was repeated except that the reactive dye composition containing compound of formula (a) and compound of formula (b) was replaced by the reactive dye composition obtained above (in this example) to obtain a dyed product dyed in bright blue color With excellent levelness.

EXAMPLE 8

Reaction for preparing the reactive dye composition in Example 6 was repeated except that the anthraquinone compound of formula (a) was replaced by the compound of formula (c) to obtain a reaction mass which contains 96 parts of compound of formula(d). To the reaction mass thus obtained, an aqueous solution prepared by dissolving 39 parts of the anthraquinone compound of formula(c) in 100 parts of water was added and they were mixed thoroughly and spray dried. The reactive dye composition thus obtained has good solubility.

Dyeing procedure in Example I was repeated except that the reactive dye composition containing compound of formula (a) and compound of formula (b) was replaced by the reactive dye composition obtained above (in this example) to obtain a dyed product dyed in bright blue color with excellent levelness.

EXAMPLE 9

To 96 parts of anthraquinone compound of formula(b), 5 parts of the anthraquinone compound of formula(c) was added and they were mixed thoroughly. The reactive dye composition thus obtained has good solubility.

Dyeing procedure in Example 1 was repeated except that the reactive dye composition containing compound of formula (a) and compound of formula (b) was replaced by the reactive dye composition obtained above (in this example) to obtain a dyed product dyed in bright blue color with excellent levelness.

EXAMPLE 10

To 96 parts of anthraquinone compound of formula(d), 5 parts of the anthraquinone compound of formula(a) was added and they were mixed thoroughly. The reactive dye composition thus obtained has good solubility.

Dyeing procedure in Example 1 was repeated except that the reactive dye composition containing compound of formula (a) and compound of formula (b) was replaced by the reactive dye composition obtained above (in this example) to obtain a dyed product dyed in bright blue color with excellent levelness.

EXAMPLE 11

To 120 parts of reactive dye composition obtained according to the same manner as in example 1, 23 parts of the anthraquinone compound of formula(c) was added and they were mixed thoroughly. The reactive dye composition thus obtained has good solubility.

Dyeing procedure in Example 1 was repeated except that the reactive dye composition containing compound of formula (a) and compound of formula (b) was replaced by the reactive dye composition obtained above (in this example) to obtain a dyed product dyed in bright blue color with excellent levelness.

EXAMPLE 12

To 120 parts of reactive dye composition obtained according to the same manner as in example 3, 23 parts of the anthraquinone compound of formula(a) was added and they were mixed thoroughly. The reactive dye composition thus obtained has good solubility.

Dyeing procedure in Example 1 was repeated except that the reactive dye composition containing compound of formula (a) and compound of formula (b) was replaced by the reactive dye composition obtained above (in this example) to obtain a dyed product dyed in bright blue color with excellent levelness.

EXAMPLE 13

To 120 parts of reactive dye composition obtained according to the same manner as in example 1, 24 parts of the anthraquinone compound of formula(d) which had been obtained according to the same conditions as in example 7 was added and they were mixed thoroughly. The reactive dye composition thus obtained has good solubility.

Dyeing procedure in Example 1 was repeated except that the reactive dye composition containing compound of formula (a) and compound of formula (b) was replaced by the reactive dye composition obtained above (in this example) to obtain a dyed product dyed in bright blue color with excellent levelness.

EXAMPLE 14

To 120 parts of reactive dye composition obtained according to the same manner as in example 3, 24 parts of the anthraquinone compound of formula(b) was added and they were mixed thoroughly. The reactive dye composition thus obtained has good solubility.

Dyeing procedure in Example 1 was repeated except that the reactive dye composition containing compound of formula (a) and compound of formula (b) was replaced with the reactive dye composition obtained above (in this example) to obtain a dyed product dyed in bright blue color with excellent levelness.

EXAMPLE 15

To 120 parts of reactive dye composition obtained according to the same manner as in example 1, 120 parts of reactive dye composition obtained according to the same manner as in example 3 was added and they were mixed thoroughly. The reactive dye composition thus obtained has good solubility.

Dyeing procedure in Example 1 was repeated except that the reactive dye composition containing compound of formula (a) and compound of formula (b) was replaced by the reactive dye composition obtained above (in this example) to obtain a dyed product dyed in bright blue color with excellent levelness.

EXAMPLE 16

To 120 parts of reactive dye composition obtained according to the same manner as in example 1, 60 parts of reactive dye, Sumifix Supra Brilliant Red 3BF, manufactured by Sumitomo Chemical Co., Ltd. was added and they were mixed thoroughly. The reactive dye composition thus obtained has good solubility.

Dyeing procedure in Example 1 was repeated except that the reactive dye composition containing compound of formula (a) and compound of formula (b) was replaced by the reactive dye composition obtained above (in this example) to obtain a dyed product dyed in bright blue color with excellent levelness.

EXAMPLE 17

In a low liquor ratio type liquid flow dyeing machine, was set 100 parts of a knit fabric made of rayon fiber. The liquor ratio and water temperature were adjusted to 1:6 and 65° C., respectively. Then, 6 parts of the reactive dye composition obtained in example 1 was dissolved in water, the resulting solution was added to dye-bath in the dyeing machine and the bath temperature was kept at 65° C. for a while. 40 parts of anhydrous sodium sulfate was added to the bath and, then, the knit fabric was treated for 20 minutes at this temperature. Thereafter, 6 parts of sodium carbonate was added to the bath, and, then, the knit fabric was treated at this temperature for 60 minutes to complete the dyeing and was washed according to a conventional manner. A dyed product dyed in bright blue color with excellent levelness was obtained.

EXAMPLE 18

In a cheese dyeing machine, was set 100 parts of a cheese type cotton yarn. The liquor ratio and water temperature were adjusted to 1:10 and 65° C., respectively. Then, 7 parts of the reactive dye composition obtained in example 1 was thoroughly mixed and dissolved in water, the resulting solution was added to dye-bath in the dyeing machine and the bath temperature was kept at 65° C. for a while. 50 parts of sodium chloride was added to the bath and, then, the yarn was treated for 30 minutes at this temperature,. Thereafter, 10 parts of sodium tertiary phosphate was added to the bath, and, then, the yarn was treated at this temperature for 60 minutes to complete the dyeing and was washed according to a conventional manner. A dyed yarn dyed in bright blue color with good levelness and showing no color density difference between inside and outside of the cheese was obtained.

EXAMPLE 19

In a high pressure liquid flow type dyeing apparatus, was set 200 parts of a mixed knit fabric consisting of 50% of cotton yarn and 50 % of polyester yarn. The liquor ratio and water temperature were adjusted to 1:10 and 80° C., respectively and pH was adjusted at 5 by using acetic acid. Then, 2 parts of a disperse dye, C.I.Disperse Blue 56, was dispersed in water with the aid of 2 parts of dispersant, Sumipon TF, manufactured by Sumitomo Chemical Co. and the resulting dispersion was added to dye-bath in the above dyeing machine. Thereafter, the temperature was elevated to 130° C. over 40 minutes and dyeing polyester in the mixed knit fabric was conducted for 40 minutes at this temperature. Then, after liquid in the dye bath was removed, water was added to the dye bath to adjust the liquor ratio and water temperature to 1:10 and 50° C., respectively.

Then, 2.4 parts of the reactive dye composition obtained in example 1 was dissolved in water, the resulting solution was added to dye-bath in the dyeing machine and the bath temperature was kept at 50° C. for a while. 80 parts of anhydrous sodium sulfate was added to the bath and, then, at this temperature, the knit fabric was treated for 20 minutes. Thereafter, 30 parts of sodium carbonate was added to the bath, and, then, the knit fabric was treated at this temperature for 60 minutes to complete the dyeing and was washed according to a conventional manner. A dyed knit fabric dyed in bright blue color with excellent levelness was obtained.

EXAMPLE 20

30 parts of the reactive dye composition obtained in example 1 was dissolved in hot water and the resulting solution was cooled to 25° C. To the dye solution thus obtained, 15 parts of 32.5 % aqueous sodium hydroxide solution and 150 parts of 50° Be of water glass were added. Then, immediately after water was added thereto at 25° C. so that total amount of the solution became 1000 parts, padding cotton fabric was conducted using the resulting solution as the padding liquor. The padded cotton fabric was rolled up, sealed with polyethylene film, left as it is for 20 hours at a room temperature of 25° C., then, washed according to a conventional manner and dried. The dyed product dyed in uniform blue dolor was obtained.

EXAMPLE 21

20 parts of the reactive dye composition obtained in example 1 was dissolved in hot water and the resulting solution was cooled to 25° C. To the dye solution thus obtained, 1 part of sodium alginate, 10 parts of methanitrobenzene sulfonic acid and 20 parts of sodium bicarbonate were added. Then, immediately after water was added thereto at 25° C. so that total amount of the solution became 1000 parts, padding cotton fabric was conducted using the resulting solution as the padding liquor. The padded cotton fabric was dried for 2 minutes at 120° C. and, then, steamed for 5 minutes at 100° C. to fix the dye. The dyed product dyed in uniform blue color was obtained.

EXAMPLE 22

In a wince dyeing machine, was set 100 parts of a knit cotton fabric. The liquor ratio and water temperature were adjusted to 1:15 and 56° C., respectively. Then, 2.4 parts of the reactive dye composition obtained in example 1 and 0.6 part of sodium salt of a condensation product of methylnaphthalene and formaldehyde having sulfonation degree of 110% and average condensation degree of 1.8 was mixed thoroughly and the resulting mixture was dissolved in 3 parts of water. The solution thus obtained was added to dye-bath in the dyeing machine and the bath temperature was kept at 56° C. for a while. 50 parts of anhydrous sodium sulfate was added into the bath and, then, at this temperature, the knit fabric was treated for 20 minutes. Thereafter, 15 parts of sodium carbonate was added to the bath, and, then, the knitted fabric was treated at this temperature for 60 minutes to complete the dyeing and was washed according to a conventional manner. A dyed product dyed in uniform blue color was obtained.

EXAMPLE 23

In a liquid flow type dyeing machine, was set 100 parts of a knit cotton fabric. The liquor ratio and water temperature were adjusted to 1:15 and 50° C., respectively. Then, 3 parts of the reactive dye composition obtained in example 1 was dissolved in water and was added to dye-bath in the dyeing machine. 150 parts of anhydrous sodium sulfate was added into the bath in two portions and, then, at 50° C., the knit fabric was treated for 20 minutes. Thereafter, 30 parts of sodium carbonate was added to the bath in three portions, and, then, the knitted fabric was treated at this temperature for 60 minutes to complete the dyeing and was washed according to a conventional manner. A dyed product dyed in blue color with excellent levelness was obtained.

EXAMPLE 24

In a cheese dyeing machine, was set 50 parts of a cheese type cotton yarn. The liquor ratio and water temperature were adjusted to 1:10 and 58° C., respectively. Then, 3 parts of the reactive dye composition obtained in example 1, 1 part of reactive dye, Remazol Yellow 3R-SN manufactured by Hoechst Co. and 5 parts of reactive dye, Sumifix Supra Brilliant Red 3BF manufactured by Sumitomo Chemical Co. were dissolved in water, the resulting solution was added to dye-bath in the dyeing machine and the bath temperature was kept at 58° C. for a while. 40 parts of anhydrous sodium sulfate was added to the bath and, then, at this temperature, the cotton yarn was treated for 30 minutes. Thereafter, 5 parts of sodium tertiary phosphate was added to the bath, and, then, the cotton yarn was treated at this temperature for 60 minutes to complete the dyeing and was washed according to a conventional manner. A dyed cotton yarn dyed in uniform purple color and showing no color density difference between inside and outside of the cheese was obtained.

EXAMPLE 25

10 parts of the reactive dye composition obtained in example 1, 20 parts of reactive dye, Sumifix Supra Yellow 3RF manufactured by Sumitomo Chemical Co., 20 parts of reactive dye, Sumifix Supra Brilliant Red 3BF manufactured by Sumitomo Chemical Co. were dissolved in hot water and the resulting solution was cooled to 25° C. To the dye solution thus obtained, 1 part of sodium alginate, 10 parts of methanitrobenzene sulfonic acid and 20 parts of sodium bicarbonate were added. Then, immediately after water was added thereto at 25° C. so that total amount of the solution became 1000 parts, padding cotton fabric was conducted using the resulting solution as the padding liquor. The padded cotton fabric was dried for 2 minutes at 120° C. and, then, steamed for 5 minutes at 100° C. to fix the dye. The dyed product dyed in uniform brown color was obtained.

EXAMPLE 26

50 parts of the reactive dye composition obtained according to the same manner as in example 1 was dissolved in hot water and the resulting solution was cooled to 25° C. To the dye solution thus obtained, 30 parts of anhydrous sodium sulfate and 18 parts of 32.5 % aqueous sodium hydroxide solution were added. Then, immediately after water was added thereto at 25° C. so that total amount of the solution became 1000 parts, padding cotton fabric was conducted using the resulting solution as the padding liquor. The padded cotton fabric was rolled up, sealed with polyethylene film, left as it is for 20 hours at a room temperature of 25° C., then, washed according to a conventional manner and dried. The dyed product dyed in uniform blue color was obtained.

EXAMPLE 27

Using a reactive dye composition obtained according to the same manner as in example 1, a color printing paste having the following composition was prepared.

| Reactive dye composition | 80 parts |
|---|---|
| Urea | 50 parts |
| Sodium alginate | 550 parts |
| Hot water | 300 parts |
| Sodium bicarbonate | 20 parts |
| Balance | |
| Total | 1000 parts |

A No. 40 cotton broad cloth was printed with 100 parts of the printing paste thus obtained and steaming treatment was conducted at 100° C. for 5 minutes. Then, the cotton cloth was washed with water, washed with hot water, soaped, washed with hot water, washed with water and dried to obtain printed cotton broad cloth showing uniform blue color.

The reactive dye composition exhibits various excellent dyeing characteristics such as reproducibility, levelling propertiy and solubility in dyeing and printing fiber materials.

What we claim is:

1. A reactive dye composition comprising 1 part by weight of an anthraquinone compound(I) which is a compound represented by the following formula:

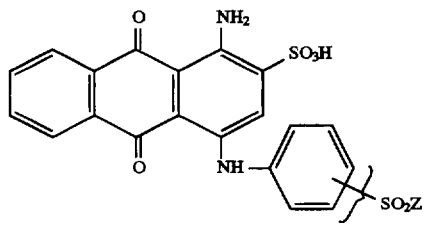

wherein Z represents $CH_2CH_2OSO_3H$ or a salt thereof, and about 1 to 4 parts by weight of an anthraquinone compound (II) which is a compound represented by the following formula:

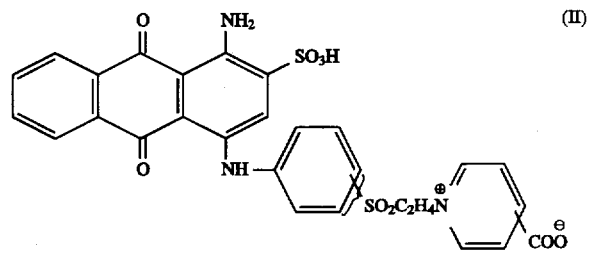

and/or a salt thereof.

2. A reactive dye composition according to claim 1 wherein the anthraquinone compound(I) is a compound represented by the following formula (III):

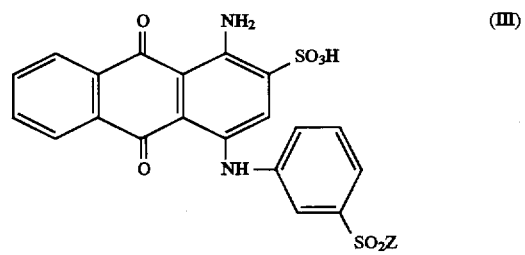

wherein Z is as defined in claim 1, or a salt thereof.

3. A reactive dye composition according to claim 1 wherein the anthraquinone compound(II) is a compound represented by the following formula (IV):

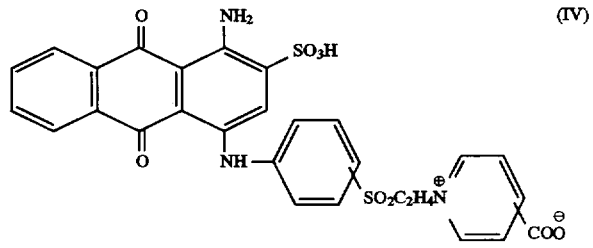

or a salt thereof.

4. A method for dyeing or printing cellulose containing fiber materials by contacting a reactive dye composition according to claim 1 with the materials.

* * * * *